(12) United States Patent
Ercan

(10) Patent No.: US 11,796,679 B2
(45) Date of Patent: Oct. 24, 2023

(54) TIME OF FLIGHT SENSOR AND METHOD

(71) Applicant: Sony Semiconductor Solutions Corporation, Kanagawa (JP)

(72) Inventor: Alper Ercan, Stuttgart (DE)

(73) Assignee: Sony Semiconductor Solutions Corporation, Kanagawa (JP)

( * ) Notice: Subject to any disclaimer, the term of this patent is extended or adjusted under 35 U.S.C. 154(b) by 1060 days.

(21) Appl. No.: 16/419,954

(22) Filed: May 22, 2019

(65) Prior Publication Data

US 2019/0369219 A1 Dec. 5, 2019

(30) Foreign Application Priority Data

May 29, 2018 (EP) .................................... 18174814

(51) Int. Cl.
*G01S 17/894* (2020.01)
*G01S 7/4865* (2020.01)
*G01S 7/497* (2006.01)
*G01S 17/36* (2006.01)

(52) U.S. Cl.
CPC .......... *G01S 17/894* (2020.01); *G01S 7/4865* (2013.01); *G01S 7/497* (2013.01); *G01S 17/36* (2013.01)

(58) Field of Classification Search
CPC .............................. H04N 5/2353; H04N 5/355
See application file for complete search history.

(56) References Cited

U.S. PATENT DOCUMENTS

| | | |
|---|---|---|
| 2008/0030605 A1 | 2/2008 | Tsukimura et al. |
| 2011/0292370 A1 | 12/2011 | Hills |
| 2012/0098935 A1 | 4/2012 | Schmidt |
| 2012/0188420 A1 | 7/2012 | Black et al. |
| 2014/0168369 A1 | 6/2014 | Crane |
| 2014/0340569 A1 | 11/2014 | Raskar |
| 2015/0001664 A1 | 1/2015 | Van Der Tempel et al. |
| 2018/0011194 A1 | 1/2018 | Masuda |
| 2018/0080877 A1* | 3/2018 | Hirawake ............... H04N 23/73 |
| 2019/0250254 A1* | 8/2019 | Campbell ............. G01S 7/4815 |
| 2019/0250257 A1* | 8/2019 | Finkelstein ........... G01S 7/4863 |

FOREIGN PATENT DOCUMENTS

| | | |
|---|---|---|
| CN | 1512136 A | 7/2004 |
| CN | 102004254 A | 4/2011 |
| CN | 102202185 A | 9/2011 |
| CN | 102798868 A | 11/2012 |
| CN | 104081528 A | 10/2014 |
| CN | 105491307 A | 4/2016 |
| CN | 107076854 A | 8/2017 |
| JP | 2010154734 A | 7/2010 |
| WO | WO 2016/156308 A1 | 10/2016 |

OTHER PUBLICATIONS

Li, Filtering for 3D Time-of-Flight Sensor. Texas Instruments. White Paper SLOA230. Jan. 2016. 9 pages.

* cited by examiner

*Primary Examiner* — Jerry T Jean Baptiste
(74) *Attorney, Agent, or Firm* — Wolf, Greenfield & Sacks, P.C.

(57) ABSTRACT

A time of flight sensor includes an image sensor; and a plurality of optical filters that are arranged on the image sensor, each of the plurality of optical filters passes light in a predefined wavelength range, and the image sensor generates a sub-frame of image data for each of the predefined wavelength ranges during an exposure time period of the image sensor.

20 Claims, 4 Drawing Sheets

TIME OF FLIGHT SENSOR AND METHOD

CROSS REFERENCE TO RELATED APPLICATIONS

The present application claims priority to European Patent Application 18174814.6 filed by the European Patent Office on May 29, 2018, the entire contents of which being incorporated herein by reference.

TECHNICAL FIELD

The present disclosure generally pertains to a time of flight sensor and a method for the time of flight sensor.

TECHNICAL BACKGROUND

Generally, a device such as a time of flight camera is known which has a light emitter and a detection source for emitting light on a scene and detecting reflected light from the scene, respectively.

For example, a time of flight camera that has an image sensor is known that emits light on a scene, collects and read-outs quads data, generates a depth map of the scene, or the like.

However, for example, if the scene includes moving objects, the moving objects within the field of view of the time of flight camera create motion artifacts, e.g., during the collection and/or read-out of the quads data.

The motion artifact results in complexity of collection and/or read-out of the quads data.

Hence, the known time of flight cameras have a slow read-out of the quad data, and the depth maps generated using such devices may typically have motion artifacts, etc.

Although time of flight sensors exist that, e.g., emit light on a scene and generate image data, it is generally desirable to improve time of flight sensors and methods for passing light in predefined wavelength ranges and generating sub-frames of image data.

SUMMARY

According to a first aspect, the disclosure provides a time of flight sensor comprising an image sensor; and a plurality of optical filters arranged on the image sensor, each of the plurality of optical filters being configured to pass light in a predefined wavelength range, wherein the image sensor generates a sub-frame of image data for each of the predefined wavelength ranges during an exposure time period of the image sensor.

According to a second aspect, the disclosure provides a method for a time of flight sensor including an image sensor comprises passing light in a predefined wavelength range by each of a plurality of optical filters being arranged on the image sensor; and generating a sub-frame of image data for each of the predefined wavelength ranges during an exposure time period of the image sensor.

Further aspects are set forth in the dependent claims, the following description and the drawings.

BRIEF DESCRIPTION OF THE DRAWINGS

Embodiments are explained by way of example with respect to the accompanying drawings, in which.

DETAILED DESCRIPTION OF EMBODIMENTS

Figure 1:
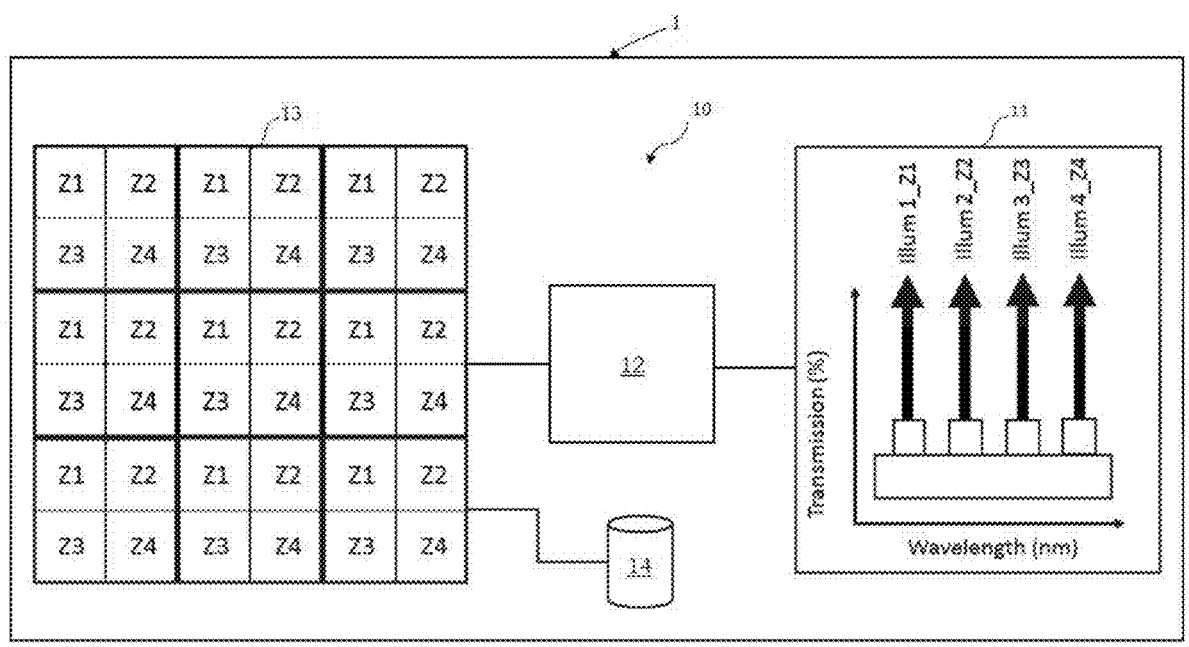
FIG. 1 schematically illustrates an embodiment of a system including the time of flight sensor, for emitting and passing lights having four predefined wavelength ranges, and generating four sub-frames of image data.

Before a detailed description of the embodiments under reference of FIG. 1 is given, general explanations are made.

As mentioned in the outset, generally it is known how to emit light on an object in a scene, detect light reflected from the object in the scene, collect and read-out the quad frames (i.e. quads data), and generate a phase map, or the like.

Moreover, in the existing devices such as a time of flight camera, if the objects in the scene move within the field of view of the time of flight camera, motion artifacts may appear, e.g., during the collection and/or read-out of the quad frames.

Furthermore, for known devices, it has been recognized that, in addition to the motion artifacts, the time of flight sensor may have a plurality of pixels that may decrease the read-out time of the quad frames. Moreover, the obtained quad frames may, for example, has to be read-out, e.g., sequentially and in successive exposures, and stored externally, which increases the cost. Furthermore, if the objects in the scene move faster (i.e. their movement speed increases) within the field of view of the camera, the motion artifacts may also become larger, which make complexity in generating the phase map.

Consequently, some embodiments pertain to a time of flight sensor including an image sensor; and a plurality of optical filters arranged on the image sensor, each of the plurality of optical filters being configured to pass light in a predefined wavelength range, wherein the image sensor generates a sub-frame of image data for each of the predefined wavelength ranges during an exposure time period of the image sensor.

The time of flight (ToF) sensor may be any type of ToF sensor that includes an image sensor.

For example, the time of flight sensor may be based on a continuous wave time of flight (CWTOF), a direct time-of-flight imager, an RF-modulated light source, a range gated imager sensor, etc., without limiting the present disclosure in that regard.

In some embodiments, the time of flight sensor may be incorporated in other electronic devices, such as, an imaging system, a smartphone, a computer, a robot, a (piece of) detection equipment, or the like.

In some embodiments, the time of flight sensor may include circuitry. The circuitry may include one or more processors, one or microprocessors, dedicated circuits, logic circuits, a memory (RAM, ROM, or the like), a storage, an interface (e.g., a wireless interface such as Bluetooth, infrared, etc.), etc., as it is generally known. In some embodiments, the time of flight sensor may include, for example, a circuitry and/or a processor and/or an image processing unit, hence, a program may be installed on its circuitry and/or its processor, moreover, the sub-frame of image data may be generated, a phase map may be generated, etc.

Moreover, in some embodiments, the interface may be adapted to communicate with a mobile telecommunication system, e.g., LTE, GSM, or the like. Moreover, the interface may further be adapted to perform wireless communication with a wireless local area network, for example, to communicate over Bluetooth. Thereby, in some embodiments, the time of flight sensor may establish a connection to the internet.

The time-of-flight sensor may include the image sensor which may be based on, e.g., a current assisted photonic demodulator (CAPD), a pinned photodiode (PPD), a photogate, a partially pinned PPD, a charge-coupled device (CCD) technology, a complementary metal oxide semiconductor (CMOS) technology, or the like. The time-of-flight sensor and/or its image sensor may include a plurality of pixels which may be arranged in a two dimensional (2D) array, a three-dimensional (3D) array, etc. For example, the image sensor may include a 2D array of pixels, wherein each pixel includes one or more light detection elements and may detect the light passed from optical filters having the predefined wavelength ranges, etc.

Moreover, a plurality of optical filters are arranged on the image sensor, and each of the plurality of optical filters passes light in a predefined wavelength range.

The plurality of optical filters may be any type of optical filter that is configured to (selectively) pass light in a predefined wavelength range. For example, the optical filter may be based on, e.g., an organic optical filter, a multi-layer optical filter, an absorption filter, a dichronic filter, an interface filter, a longpass filter that passes long wavelengths only, a shortpass filter that passes short wavelengths only, a bandpass filter, an infrared optical filter, a UV optical filter, or the like, without limiting the present disclosure to an specific optical filter.

Moreover, the image sensor generates a sub-frame of image data for each of the predefined wavelength ranges during an exposure time period of the image sensor.

The image data may be representative of light reflected from objects in a scene, may represent distance information between the objects in the scene and the image sensor, may represent a depth map of the scene, etc., as it is generally known by the skilled person.

In some embodiments, a frame of image data may be a single measurement during an exposure time period of the image sensor.

Moreover, in some embodiments, each frame may be divided into a similar set of measurements called sub-frames.

In some embodiments, each sub-frame may include all the measurements necessary for a phase computation. Moreover, multiple sub-frames may be used to, for example, overcome the limitations of pixel saturation, enhance the dynamic range of the ToF sensor, etc.

In some embodiments, each sub-frame may be divided into quads (for example, 1-quad, 2-quad, 3-quad, . . . n-quad), moreover, each quad may represent a different phase between the (i.e. emitted) lights having the predefined wavelength ranges.

As discussed, the ToF sensor may include the plurality of the optical filters in which each filter passes light in the corresponding predefined wavelength range. Moreover, the image sensor may generate a sub-frame of image data for each predefined wavelength range.

For example, in some embodiments, the plurality of optical filters may pass light in four predefined wavelength ranges, moreover, the image sensor may generates four sub-frames of image data in which each sub-frame may represent one predefined wavelength range, e.g., in some embodiments, a program running on time of flight sensor (and/or the circuitry and/or the processor) may generate the sub-frame of image data, as it is generally known by the skilled person.

In some embodiments, the image sensor may include a plurality of pixels, wherein each of the plurality of pixels may be associated with one of the plurality of optical filters.

For example, the image sensor may be based on a CMOS image sensor with an area of Z (mm$^2$) and having an array of $m_n \times n_m$ pixels, wherein m represents the number of pixels in the row and n represents the number of pixels in the column of the array of pixels in the image sensor.

The plurality of the optical filters may be arranged, e.g., on the array of pixels of the image sensor, or the like. For example, the plurality of optical filters may be based on an organic optical filter and may be deposited on the array of pixels of the image sensor.

In some embodiments, one optical filter may be deposited on each pixel of the image sensor.

In some embodiments, more than one optical filter may be deposited on each pixel of the image sensor, for example, each pixel may further be divided to, e.g., multiple sub-pixels, furthermore, one optical filter may be deposited on each sub-pixel, or the like.

In some embodiments, each of the plurality of pixels may detect light passed through its associated optical filter.

For example, the plurality of optical filters may be deposited on the plurality of pixels of the image sensor. Moreover, each optical filter may pass light in a predefined wavelength range, e.g., each optical filter passes a specific band (i.e. having the predefined wavelength range) and may further block the rest of the light. Furthermore, each pixel may detect the light which is passed through the optical filter (i.e. one or more optical filters) that is deposited on top of the pixel, etc.

In some embodiments, a frame of image data including the sub-frames of image data being generated during the exposure time period may represent a phase map.

For example, the image sensor may include the array of pixels (i.e. $m_n \times n_m$ pixels), moreover, each pixel may be associated with multiple optical filters (e.g., four different optical filters may be deposited on each pixel of the image sensor).

Moreover, each optical filter passes light in its corresponding predefined wavelength range, the pixels of the image sensor detect light passed from the associated optical filters, as discussed above, and the image sensor may generate the frame of image data which may include the sub-frame of the image data for each of the predefined wavelength ranges during the exposure time period of the image sensor.

As discussed, the time of flight sensor may send the light having the predefined wavelength range (e.g., by a light emitting unit) to a scene, and objects in the scene may reflect the light, and parts of the light reflected from the objects may be detected by, e.g., the image sensor of the ToF sensor.

In some embodiments, the round-trip time from the ToF sensor to the scene and back to the image sensor of the ToF sensor may be an indicator of the distance between the object that reflected the light having the predefined wavelength range and the image sensor.

Moreover, in some embodiments, the passed lights having the predefined wavelength ranges may be periodic, hence, the phase difference between the emitted light and the received light on the image sensor may be an indicator of the round-trip time.

Therefore, in some embodiments, the frame of image data may represent the phase map.

In some embodiments, each sub-frame of image data may be associated with a phase shift between the lights passed from the plurality of the optical filters having the predefined wavelength ranges.

For example, the plurality of optical filters may pass lights having the predefined wavelength ranges, and there might be a phase shift between the predefined wavelength ranges.

Moreover, the generated frame of image data may be divided into sub-frames of the image data, and each sub-frame of image data may be associated to one specific predefined wavelength range.

In some embodiments, the frame of image data may be associated with one exposure time period.

For example, the plurality of optical filters may pass the predefined wavelength ranges which are simultaneously modulated, moreover, the frame of image data may be generated, for example, during one exposure time period.

As discussed above, in some embodiments, the frame of image data may include the sub-frames of image data. Moreover, each sub-frame may be associated with a quad data. Therefore, in some embodiments, it may be possible to simultaneously collect, e.g., n-quad data (i.e. multiple quad data) during one exposure time period.

In some embodiments, the time of flight sensor may further include a plurality of light emitting units, moreover, each of the plurality of light emitting units may further be configured to emit light having a predefined wavelength range.

The time of flight sensor may include the plurality of light emitting units. The plurality of light emitting units may be based on a light emitting diode (LED), a laser light, a high intensity discharge (HID), e.g. a xenon lamp, etc., without limiting the present disclosure in that regard.

In some embodiments, the plurality of the light emitting units may be based on an array, including multiple light emitting elements, such as laser elements or LED elements. Moreover, each light emitting element (e.g., LED) may emit light in a specific predefined wavelength range.

In some embodiments, the time of flight sensor may further include a timing unit configured to control each of the plurality of light emitting units to emit the light having the predefined wavelength range at a different predetermined time for causing a phase shift between the emitted lights having the predefined wavelength ranges.

The timing unit may be based on a time generator, a delay generator, a synchronizer, or the like, without the limiting the present disclosure to a specific timing generator.

For example, the timing unit may control each of the plurality of light emitting units to emit the light having the predefined wavelength range at a specific predetermined time. Moreover, in some embodiments, the phase shift between the emitted lights having the predefined wavelength ranges may be produced, as it is generally known.

In some embodiments, the predefined wavelength ranges may be in the infrared range.

For example, the time of flight sensor may include the plurality of light emitting units. The plurality of light emitting units may be based on an infrared light emitting diodes (infrared-LEDs), and may further emit light in the infrared range.

In some embodiments, the time of flight sensor may be based on a four optical filters sensor, moreover, the generated frame of image data may represents a quad data.

For example, the time of flight sensor may include four illumination units (e.g. four different LEDs) which may emit light in four different predefined wavelength ranges.

Moreover, four optical filters may be deposited on one pixel of the image sensor, and each optical filter passes light in one of the four predefined wavelength ranges. For instance, the pixel may include four sub-pixels and one optical filter deposited on each sub-pixel, as discussed above.

Furthermore, the timing unit may cause the phase shift, as discussed above, and the image sensor may generate four sub-frames of image data and each sub-frame may include one quad data and may be associated to one specific predefined wavelength range.

In some embodiments, it may be possible to, e.g., simultaneously modulate at four different predefined wavelength ranges, and may further collect four quads data at the same time, or the like. For example, all four quads data may be collected simultaneously in the same exposure time by the plurality of the pixels.

In some embodiments, a single exposure measurement may be performed, and the depth map may be generated from the single exposure, as discussed above.

In some embodiments, the motion artifacts may be reduced, the read-out time of the quad-frames data may be increased and the complexity of the time of flight sensor and/or the measurements of the phase map may be reduced.

In some embodiments, multiple optical filters may be arranged on, e.g., the array of pixels of the image sensor, multiple light emitting unit may emit the predefined wavelength ranges simultaneously, and the frame of image data may be generated during one exposure time period, or the like.

In some embodiments, the predefined wavelength range may depend on the applied mod, moreover the contrast of the image data and/or a mismatch between the pixels of the image sensor may require a calibration of the measurements.

In some embodiments, a pixel-to-pixel isolation may be performed, and a quad-quad coupling of the measurements may be prevented.

In some embodiments, the number of the plurality of optical filters and the predefined wavelength ranges may depend on, e.g., the illuminating units, the performance of the illuminating unit, the stability of the illuminating unit, etc.

In some embodiments, the frame of image data and/or the sub-frame of image data may be read-out and may further be stored, e.g, on a ToF sensor with in-pixel storage, or the like.

In some embodiments, the image sensor and the time-of-flight (ToF) sensor may be based on an identical sensor (e.g. CMOS image sensor) which may be combined together. Hence, in some embodiments, the image sensor and the time-of-flight (TOF) sensor may be the same and/or may share a common CMOS image sensor.

Moreover, the image sensor may further include additional elements such as a plurality of analog-to-digital converters, a plurality of photo-detectors, activation code generators, scanners, and a plurality of analog signal multiplexer, etc.

Some embodiments pertain to a method for a time of flight sensor having an image sensor, including passing light in a predefined wavelength range by each of a plurality of optical filters being arranged on the image sensor; and generating a sub-frame of image data for each of the predefined wavelength ranges during an exposure time period of the image sensor.

As discussed, the image sensor generates sub-frames of image data, moreover, a frame of image data including the sub-frames of image data may be generated during the exposure time period and may represent a phase map. Moreover, each sub-frame of image data may be associated with a phase shift between the lights passed from the plurality of the optical filters having the predefined wavelength ranges. As discussed, the frame of image data may be generated, moreover, the frame of image data may be associated with one exposure time period. Moreover, the method may further include emitting light having a predefined wavelength range. Moreover, the method may further include controlling each of the plurality of light emitting units to emit the light having the predefined wavelength range at a different predetermined time for causing a phase shift between the emitted lights having the predefined wavelength ranges. Moreover, the image sensor may include a plurality of pixels, and each of the plurality of pixels may be associated with one of the plurality of optical filters. As discussed, the plurality of optical filters may pass light in the predefined wavelength ranges, the method may further include detecting, by each of the plurality of pixels, light passed through its associated optical filter. Moreover, the time of flight sensor may be a four optical filters sensor, and the generated frame of image data may represent a quad data. As discussed, the method may include emitting light in the predefined wavelength ranges, moreover, the predefined wavelength ranges may be in the infrared range.

The methods as described herein are also implemented in some embodiments as a computer program causing a computer and/or a processor to perform the method, when being carried out on the computer and/or processor. In some embodiments, also a non-transitory computer-readable recording medium is provided that stores therein a computer program product, which, when executed by a processor, such as the processor described above, causes the methods described herein to be performed.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Returning to FIG. 1, an embodiment of a system 1 including the time of flight sensor 10 is illustrated. The system 1 may be the time of flight sensor and/or the time of flight sensor may be incorporated in the system 1.

For example, the system 1 may be a time of flight camera which includes the time of flight sensor 10, without limiting the present disclosure in that regards.

The time of flight sensor 10 has a plurality of light emitting units 11, a timing unit 12, an image sensor 13 and a memory 14, which form a circuitry (not shown).

The plurality of the light emitting units 11 are based on laser light sources and include four different light emitting elements (Illum_Z1, Illum_Z2, Illum_Z3, and Illum_Z4). Each of the light emitting elements emit a light at a predefined wavelength range, as discussed above.

In the present embodiment, the predefined wavelength rage is infrared range.

The timing unit 12 is based on a time generator and controls each of the plurality of light emitting units 11 to emit the light having the predefined wavelength range at a different predetermined time, as discussed above. Hence, the timing unit 12 causes a phase shift between the emitted lights having the predefined wavelength ranges.

The time of flight sensor 10 further includes the image sensor 13 which is based on a CCD image sensor.

The images sensor 13 includes a two-dimensional array of pixels in the form of a 3×3 array of pixels. Each pixel has an area of Z and is further divided into four sub-pixels of Z1, Z2, Z3, and Z4, respectively.

A plurality of the optical filters are deposited on top of the sub-pixels in the array of pixels of the image sensor 13, as discussed above.

In the present embodiments, four different optical filters, which are based on organic optical filters, are deposited on top of the four sub-pixels, as discussed above.

The optical filters corresponding to the areas of Z1, Z2, Z3, and Z4 pass light in the predefined wavelength range of corresponding light emitting elements of the Illum_Z1, Illum_Z2, Illum_Z3, and Illum_Z4, respectively, as discussed above.

Each sub-pixel in the areas of Z1, Z2, Z3, and Z4 detects light passed through its associated optical filter deposited on top of the sub-pixel, as discussed above.

Moreover, the image sensor generates four sub-frames of image data for each of the predefined wavelength ranges, as discussed above.

In the present embodiment, each sub-frame of image data corresponds to a quad data, and the time of flight sensor 10 generates (i.e. collects) four quads data, during one exposure time period.

Moreover, the time of flight sensor 13 further generates a frame of image data which includes the four sub-frames, as discussed above.

The time of flight sensor 10 further includes a storage 14 which is based on flash memory and is used for storing the four sub-frames of image data, the four quads data, and the frame of image data.

Hence, the time of flight sensor 10 is able to generate the frame of image data during one exposure time, as discussed above.

Figure 2:
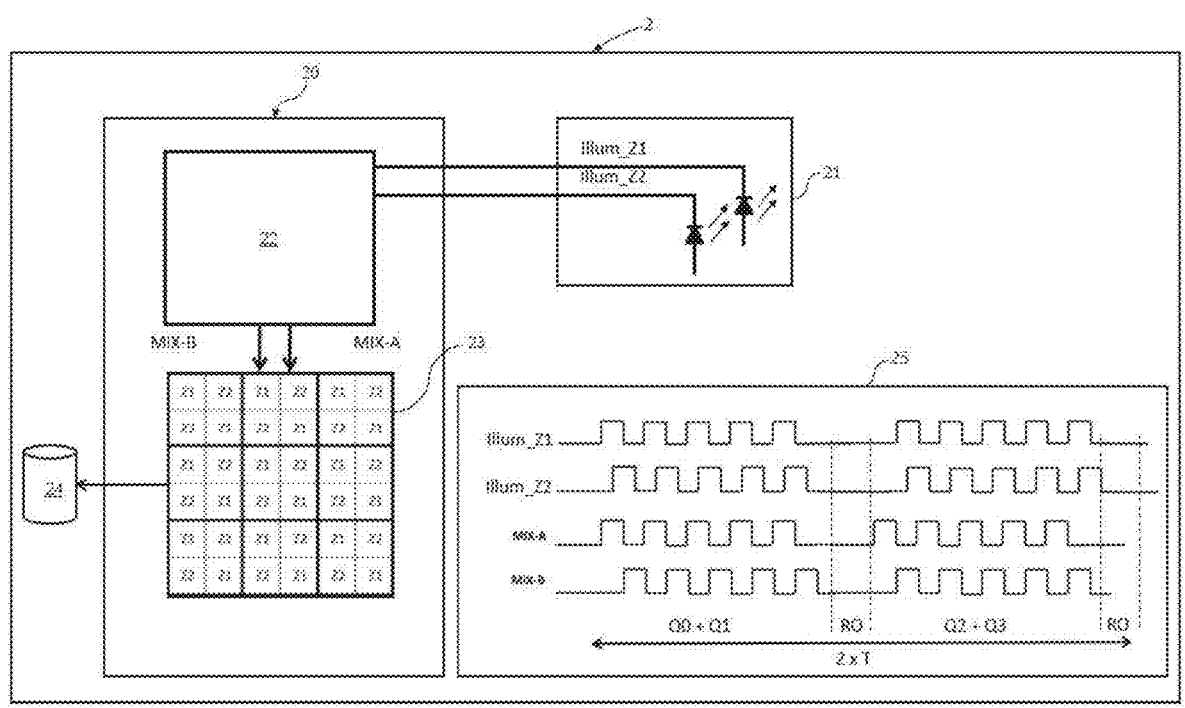
FIG. 2 schematically illustrates an embodiment of a system including the time of flight sensor for emitting lights having two predefined wavelength ranges, generating two sub-frames of image data, and generating a frame of image data.

FIG. 2 illustrates an embodiment of a system 2 including an illumination unit 21, a time of flight sensor 20, and a storage 24, which form a circuitry (not shown).

The system 2 may be the time of flight sensor and/or the time of flight sensor may be incorporated in the system 2.

The time of flight sensor 20 is similar and functions similarly to time of flight sensor 10 of FIG. 1.

Moreover, the system 2 has a light emitting unit 21 which includes two light emitting elements of Illum_Z1, Illum_Z2 which are similar to the light emitting elements of FIG. 1 (i.e. with the same reference number). Each of the light emitting elements emits a light at a predefined wavelength range, as discussed above.

The time of flight sensor 20 includes a timing unit 22, and an image sensor 23.

The timing unit 22 is based on a time generator and controls each of the plurality of light emitting elements 21 to emit the light having the predefined wavelength ranges (i.e. Illum_Z1, Illum_Z2) at a different predetermined time, as discussed above. Hence, the timing unit 22 causes a phase shift between the emitted lights having the predefined wavelength ranges (i.e. Illum_Z1, Illum_Z2), as discussed above.

The time of flight sensor 20 further includes the image sensor 23 which is based on a CCD image sensor.

The images sensor 23 includes a two-dimensional array of pixels in the form of a 3×3 array of pixels. Each pixel has an area of Z and is further divided into four sub-pixels, as discussed above.

In the present embodiments, two different optical filters which are based on organic optical filters are deposited on top of the four sub-pixels, as discussed above. Hence, each pixels has four sub-pixels in which two of them have identical optical filters of Z1 or Z2.

The optical filters corresponding to the areas of Z1 passes light in the predefined wavelength range of corresponding light emitting elements of the Illum_Z1, as discussed above. Moreover, the optical filters corresponding to the areas of Z2 passes light in the predefined wavelength range of corresponding light emitting elements of the Illum_Z2, as discussed above.

Each sub-pixel in the areas of Z1 or Z2 detect light passed through its associated optical filter deposited on top of the sub-pixels, as discussed above.

Moreover, the image sensor generates two sub-frames of image data for two predefined wavelength ranges (i.e. Illum_Z1, Illum_Z2), as discussed above.

Each sub-frame of image data corresponds to two quads data of Q0+Q1 and/or Q2+Q3, moreover, the time of flight sensor 23 further generates a frame of image data which includes the two sub-frames of image data.

Hence, the time of flight sensor 20 collects the four quads data (i.e. Q0, Q1, Q2, and Q3), during one exposure time period (i.e. simultaneously, by different pixels), as discussed above.

The system 2 further includes the storage 24 which is used for storing in database 25, the predefined wavelength ranges (Illum_Z1, Illum_Z2), two sub-frames of image data, four quads data (Q0, Q1, Q2, and Q3), the read out time (RO), the integration time (2×T), or the like.

Hence, the time of flight sensor 20 is able to generate the frame of image data during one exposure time, as discussed above.

Figure 3:
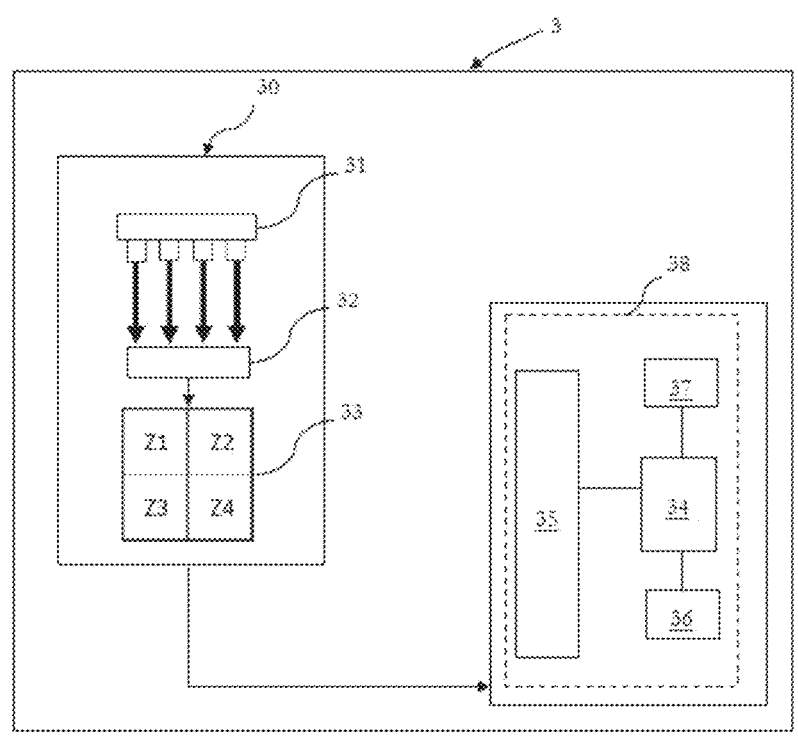
FIG. 3 schematically illustrates an embodiment of a system including a circuitry and the time of flight sensor for passing lights having the predefined wavelength ranges and generating a sub-frame of image data.

FIG. 3 schematically illustrates an embodiment of a system 3 having a circuitry 38 and the time of flight sensor 30 for passing lights having the predefined wavelength ranges and generating a sub-frame of image data.

The system 3 has a circuitry 38 running a program, which is used for generating the sub-frames of image data and the frame of image data, as discussed above.

The time of flight sensor 30 has a light emitting element 31, a timing unit 32 and an image sensor 33.

The plurality of the light emitting units 31 are based on laser light sources and include four different light emitting elements. Each of the light emitting elements emits a light at a predefined wavelength range, as discussed above.

The timing unit 32 is based on a time generator and controls each of the plurality of light emitting units 31 to emit the light having the predefined wavelength range at a different predetermined time, as discussed above. Hence, the timing unit 32 causes a phase shift between the emitted lights having the predefined wavelength ranges.

The time of flight sensor 30 further includes the image sensor 33 which is based on a CCD image sensor.

The images sensor 33 includes four sub-pixels of Z1, Z2, Z3, and Z4, respectively.

A plurality of the optical filters are deposited on top of the sub-pixels, as discussed above.

In the present embodiments, four different optical filters, which are based on organic optical filters, are deposited on top of the four sub-pixels, as discussed above.

The optical filters corresponding to the areas of Z1, Z2, Z3, and Z4 pass light in the predefined wavelength range of corresponding light emitting elements, as discussed above.

Each sub-pixel in the areas of Z1, Z2, Z3, and Z4 detects light passed through its associated optical filter deposited on top of the sub-pixels, as discussed above.

Moreover, the image sensor generates four sub-frames of image data for each of the predefined wavelength ranges, as discussed above.

The circuitry 38 has a processor 34 (including one or more processor), a random access memory 36, an interface 35, and a storage 37, wherein the storage 37 is a flash memory in these embodiments, without limiting the disclosure in that regard.

The interface 35 is configured to perform communication over wire and wirelessly (Bluetooth and wireless local area network). The interface may further be able to communicate with other electronic devices over internet, a network, a stored database in the cloud, etc.

The processor 34 is able to run the program for generating the sub-frames of image data, generating the frame of image data, generating a phase map, etc., as discussed above, and it may be configured to perform the method as also discussed above and further below.

Figure 4:
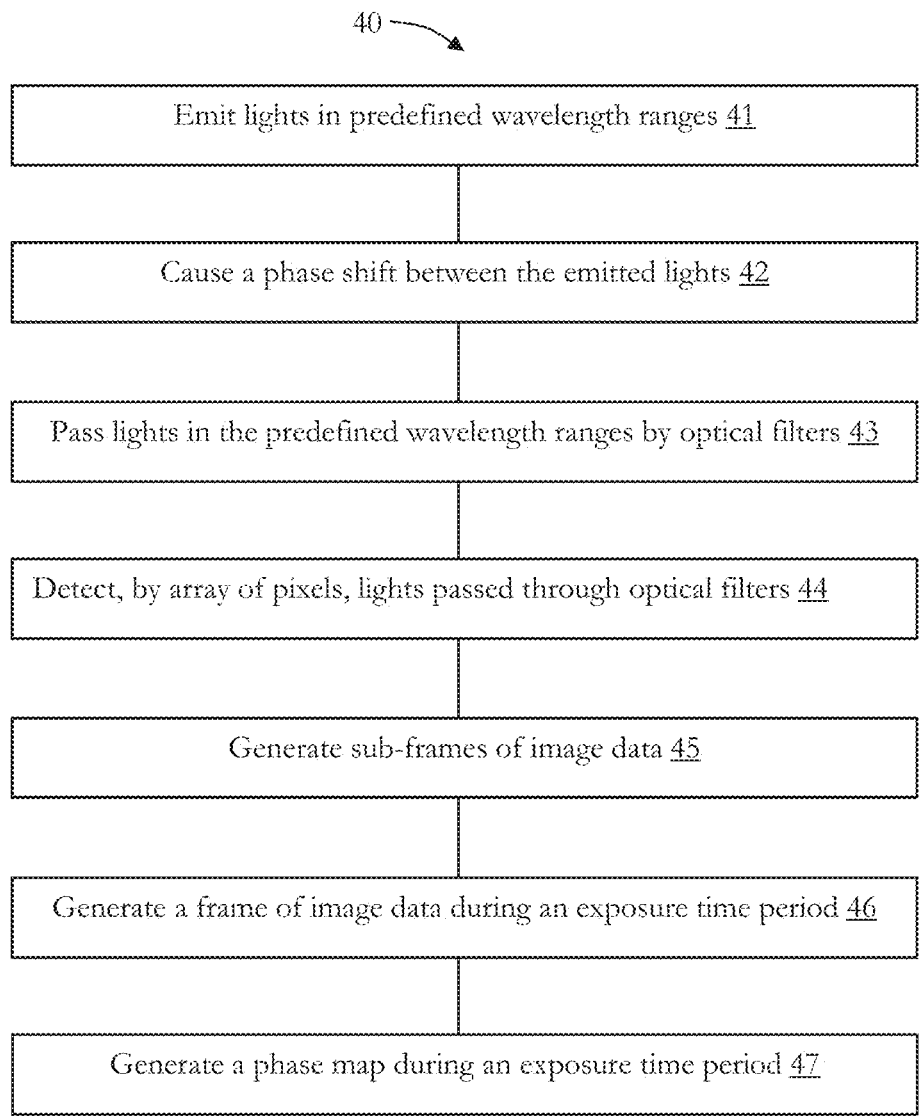
FIG. 4 illustrates a method for generating, a frame of image data and a phase map, during an exposure time period.

In the following, a method 40 for generating a frame of image data and generating a phase map is explained under the reference of FIG. 4. The method may be performed by and with any of the time of flight sensors and/or systems and/or circuitries described herein, such as the time of flight sensor 10 of FIG. 1 and the time of flight sensor 20 of FIG. 2, and the time of flight sensor 30 of the FIG. 3. Without limiting the disclosure, in the following, the method 40 is discussed exemplary based on the time of flight sensor 10 which is similar to the time of flight sensors 20 and 30.

At 41, the light emitting unit 11 of the time of flight sensor 10 emits lights in predefined wavelength ranges, as discussed above.

The plurality of the light emitting units 11 which are based on laser light sources and include four different light emitting elements (Illum_Z1, Illum_Z2, Illum_Z3, and Illum_Z4). Each of the light emitting elements emits a light at a predefined wavelength range, as discussed above.

At 42, the timing unit 12 in the time of flight sensor 10 causes a phase shift between the emitted lights, as discussed above.

The timing unit 12 which is based on a time generator and controls each of the plurality of light emitting units 11 to emit the light having the predefined wavelength range at a different predetermined time, as discussed above. Hence, the timing unit 12 causes a phase shift between the emitted lights having the predefined wavelength ranges.

At 43, the optical filters deposited on the image sensor 13 of the time of flight sensor 10 pass lights in the predefined wavelength ranges, as discussed above.

A plurality of the optical filters are deposited on top of the sub-pixels in the array of pixels of the image sensor 13, as discussed above.

The optical filters corresponding to the areas of Z1, Z2, Z3, and Z4 pass light in the predefined wavelength range of corresponding light emitting elements, as discussed above.

At 44, the image sensor 13 of the time of flight sensor 10 detects lights passed through optical filters, as discussed above.

At 45, the time of flight sensor 10 generates sub-frames of image data, as discussed above. For example, the program running on the circuitry of the time of flight sensor generates the sub-frames of image data, as discussed above.

At 46, the time of flight sensor 10 generates a frame of image data during an exposure time period, as discussed above. For example, the program running on the circuitry of the time of flight sensor generates the frame of image data which include the sub-frames of image data, as discussed above.

At 47, the time of flight sensor 10 generates a phase map during an exposure time period, as discussed above.

For example, the program running on the circuitry of the time of flight sensor generates the phase map based on the generated frame of image data and/or the generated sub-frames of image data, as discussed above.

It should be recognized that the embodiments describe methods with an exemplary ordering of method steps. The specific ordering of method steps is however given for illustrative purposes only and should not be construed as binding. For example the ordering of 24 and 25 in the embodiment of FIG. 2 may be exchanged. Also, the ordering of 30 and 38 in the embodiment of FIG. 3 may be exchanged. Other changes of the ordering of method steps may be apparent to the skilled person.

Please note that the division of the circuitry 38 into units 34 to 37 is only made for illustration purposes and that the present disclosure is not limited to any specific division of functions in specific units. For instance, the circuitry 38 could be implemented by a respective programmed processor, field programmable gate array (FPGA) and the like.

A method for controlling an electronic device, such as the time of flight sensor 10 discussed above, is described in the following and under reference of FIG. 4. The method can also be implemented as a computer program causing a computer and/or a processor, such as processor 34 discussed above, to perform the method, when being carried out on the computer and/or processor. In some embodiments, also a non-transitory computer-readable recording medium is provided that stores therein a computer program product, which, when executed by a processor, such as the processor described above, causes the method described to be performed.

All units and entities described in this specification and claimed in the appended claims can, if not stated otherwise, be implemented as integrated circuit logic, for example on a chip, and functionality provided by such units and entities can, if not stated otherwise, be implemented by software.

In so far as the embodiments of the disclosure described above are implemented, at least in part, using software-controlled data processing apparatus, it will be appreciated that a computer program providing such software control and a transmission, storage or other medium by which such a computer program is provided are envisaged as aspects of the present disclosure.

Note that the present technology can also be configured as described below.

(1) A time of flight sensor comprising:
an image sensor; and
a plurality of optical filters arranged on the image sensor, each of the plurality of optical filters being configured to pass light in a predefined wavelength range, wherein the image sensor generates a sub-frame of image data for each of the predefined wavelength ranges during an exposure time period of the image sensor.

(2) The time of flight sensor of (1), wherein a frame of image data including the sub-frames of image data being generated during the exposure time period represents a phase map.

(3) The time of flight sensor of (1) or (2), wherein each sub-frame of image data is associated with a phase shift between the lights passed from the plurality of the optical filters having the predefined wavelength ranges.

(4) The time of flight sensor of anyone of (1) to (3), wherein the frame of image data is associated with one exposure time period.

(5) The time of flight sensor of anyone of (1) to (4), further comprising a plurality of light emitting units, wherein each of the plurality of light emitting units is configured to emit light having a predefined wavelength range.

(6) The time of flight sensor of anyone of (1) to (5), further comprising a timing unit configured to control each of the plurality of light emitting units to emit the light having the predefined wavelength range at a different predetermined time for causing a phase shift between the emitted lights having the predefined wavelength ranges.

(7) The time of flight sensor of anyone of (1) to (6), wherein the image sensor comprises a plurality of pixels, wherein each of the plurality of pixels is associated with one of the plurality of optical filters.

(8) The time of flight sensor of anyone of (1) to (7), wherein each of the plurality of pixels detects light passed through its associated optical filter.

(9) The time of flight sensor of anyone of (1) to (8), is a four optical filters sensor, and wherein the generated frame of image data is representing a quad data.

(10) The time of flight sensor of anyone of (1) to (9), wherein the predefined wavelength ranges are in the infrared range.

(11) A method for a time of flight sensor including an image sensor, comprises:
passing light in a predefined wavelength range by each of a plurality of optical filters being arranged on the image sensor; and
generating a sub-frame of image data for each of the predefined wavelength ranges during an exposure time period of the image sensor.

(12) The method of (11), wherein a frame of image data including the sub-frames of image data being generated during the exposure time period represents a phase map.

(13) The method of (11) or (12), wherein each sub-frame of image data is associated with a phase shift between the lights passed from the plurality of the optical filters having the predefined wavelength ranges.

(14) The method of anyone of (11) to (13), wherein the frame of image data is associated with one exposure time period.

(15) The method of anyone of (11) to (14), further comprising emitting light having a predefined wavelength range.

(16) The method of any one of (11) to (15), further comprising controlling each of the plurality of light emitting units to emit the light having the predefined wavelength range at a different predetermined time for causing a phase shift between the emitted lights having the predefined wavelength ranges.

(17) The method of anyone of (11) to (16), wherein the image sensor comprises a plurality of pixels, wherein each of the plurality of pixels is associated with one of the plurality of optical filters.

(18) The method of anyone of (11) to (17), further comprising detecting, by each of the plurality of pixels, light passed through its associated optical filter.

(19) The method of anyone of (11) to (18), wherein the time of flight sensor is a four optical filters sensor, and wherein the generated frame of image data is representing a quad data.

(20) The method of anyone of (11) to (19), wherein the predefined wavelength ranges are in the infrared range.

(21) A computer program comprising program code causing a computer to perform the method according to anyone of (11) to (20), when being carried out on a computer.

(22) A non-transitory computer-readable recording medium that stores therein a computer program product, which, when executed by a processor, causes the method according to anyone of (11) to (20) to be performed.

The invention claimed is:

1. A time of flight sensor comprising:
an image sensor having an array of pixels; and
a plurality of optical filters arranged on the image sensor, wherein:
   each optical filter in the plurality of optical filters being configured to pass light through each optical filter in a predefined wavelength range,
   a first optical filter in the plurality of optical filters being configured to pass light through the first optical filter in a first predefined wavelength range,
   a second optical filter in the plurality of optical filters being configured to pass light through the second optical filter in a second predefined wavelength range,
   the first predefined wavelength range is different than the second predefined wavelength range,
   the first optical filter is arranged on a different area of the image sensor than the second optical filter,
   the image sensor generates a sub-frame of image data for each of the predefined wavelength ranges during an exposure time period of the image sensor,
   the first optical filter being disposed on a first subset of pixels of the array of pixels,
   the second optical filter being disposed on a second subset of pixels of the array of pixels,
   the first subset of pixels being different from the second subset of pixels.

2. The time of flight sensor of claim 1, wherein a frame of image data including the sub-frames of image data being generated during the exposure time period represents a phase map.

3. The time of flight sensor of claim 1, wherein each sub-frame of image data is associated with a phase shift between the lights passed through the plurality of the optical filters having the predefined wavelength ranges.

4. The time of flight sensor of claim 2, wherein the frame of image data is associated with one exposure time period.

5. The time of flight sensor of claim 1, further comprising a plurality of light emitting units, wherein each light emitting unit of the plurality of light emitting units is configured to emit light having the predefined wavelength range.

6. The time of flight sensor of claim 5, further comprising a timing unit configured to control each light emitting unit of the plurality of light emitting units to emit the light having the predefined wavelength range at a different predetermined time for causing a phase shift between the emitted lights having the predefined wavelength ranges.

7. The time of flight sensor of claim 1 wherein each pixel of the array of pixels is associated with one optical filters of the plurality of optical filters.

8. The time of flight sensor of claim 7, wherein each pixel of the array of pixels detects light passed through its associated optical filter.

9. The time of flight sensor of claim 1, is a four optical filters sensor, and wherein the generated sub-frames of image data is representing a quad data.

10. The time of flight sensor of claim 1, wherein the predefined wavelength ranges are in an infrared range.

11. A method for a time of flight sensor including an image sensor having an array of pixels, the method comprises:
passing light in a predefined wavelength range through each optical filter in a plurality of optical filters being arranged on the image sensor, wherein:
   a first optical filter in the plurality of optical filters being configured to pass light through the first optical filter in a first predefined wavelength range,
   a second optical filter in the plurality of optical filters being configured to pass light through the second optical filter in a second predefined wavelength range,
   the first predefined wavelength range is different than the second predefined wavelength range,
   the first optical filter is arranged on a different area of the image sensor than the second optical filter,
   the first optical filter being disposed on a first subset of pixels of the array of pixels,
   the second optical filter being disposed on a second subset of pixels of the array of pixels,
   the first subset of pixels being different from the second subset of pixels; and
generating a sub-frame of image data for each of the predefined wavelength ranges during an exposure time period of the image sensor.

12. The method of claim 11, wherein a frame of image data including the sub-frames of image data being generated during the exposure time period represents a phase map.

13. The method of claim 11, wherein each sub-frame of image data is associated with a phase shift between the lights passed through the plurality of the optical filters having the predefined wavelength ranges.

14. The method of claim 12, wherein the frame of image data is associated with one exposure time period.

15. The method of claim 11, further comprising emitting light having a predefined wavelength range.

16. The method of claim 15, further comprising controlling each light emitting unit of the plurality of light emitting units to emit the light having the predefined wavelength range at a different predetermined time for causing a phase shift between the emitted lights having the predefined wavelength ranges.

17. The method of claim 11, wherein each pixel of the array of pixels is associated with one of the plurality of optical filters.

18. The method of claim 17, further comprising detecting, by each pixel of the array of pixels, light passed through its associated optical filter.

19. The method of claim 11, wherein the time of flight sensor is a four optical filters sensor, and wherein the generated frame of image data is representing a quad data.

20. The method of claim 11, wherein the predefined wavelength ranges are in an infrared range.

* * * * *